United States Patent [19]
Wardle et al.

[11] Patent Number: 5,310,269
[45] Date of Patent: May 10, 1994

[54] ROLLER BEARINGS

[75] Inventors: Frank P. Wardle, Bodegraven, Netherlands; Mark A. Harris, Newark, United Kingdom

[73] Assignee: RHP Bearings Limited, Newark, United Kingdom; a part interest

[21] Appl. No.: 853,712

[22] Filed: Jun. 5, 1992

[30] Foreign Application Priority Data

Oct. 6, 1989 [GB] United Kingdom ............. 8922563.5

[51] Int. Cl.$^5$ .............................................. F16C 33/36
[52] U.S. Cl. ..................................... 384/568; 384/450
[58] Field of Search ............... 384/568, 450, 571, 569, 384/558

[56] References Cited

U.S. PATENT DOCUMENTS

| | | | |
|---|---|---|---|
| 1,646,947 | 10/1927 | Armstrong | 384/568 |
| 1,787,214 | 12/1930 | Shafer | 384/565 |
| 2,418,322 | 4/1947 | Spicacci | 384/571 |
| 4,557,613 | 12/1985 | Tallian et al. | 384/568 |

FOREIGN PATENT DOCUMENTS 2434954 3/1980 France .
151425 3/1932 Switzerland .

*Primary Examiner*—Lenard A. Footland
*Attorney, Agent, or Firm*—Sughrue, Mion, Zinn, Macpeak and Seas

[57] ABSTRACT

A roller bearing constructed in accordance with the invention comprises inner and outer rings and rollers therebetween as is known. The rings have no ribs, flanges or grooves but instead axial inner surfaces of the rings provide raceways which are substantially convex and the axial outer surfaces of the rollers are substantially concave to match. These concave and convex surfaces contact one another over contact zones. Each roller has an external surface which is asymmetrical relative to the center of the roller and the geometry is such that during use frictional moments develop at the contact zones between the rollers and the rings to generate a positive skew force on the rollers. This renders the bearing self-tracking.

13 Claims, 6 Drawing Sheets

ROLLER BEARINGS

TECHNICAL FIELD

The present invention relates in general to roller bearings.

BACKGROUND OF THE INVENTION

Roller bearings with cylindrical, tapered or spherical rollers are composed of inner and outer rings with a complement of rollers usually spaced apart with a cage therebetween. Many designs of roller bearings have grooves or ribs or flanges on at least one of the rings to define a raceway which guides the tracking of the rolling motion of the rollers as the rings rotate relative to one another. Modifications of the shape or profile of the rollers can improve the performance of the bearings under thrust load.

DISCLOSURE OF THE INVENTION

A roller bearing constructed in accordance with the invention comprises inner and outer rings and rollers therebetween as is know. The rings have no ribs, flanges or grooves but instead axial inner surfaces of the rings provide raceways which are substantially convex and the axial outer surfaces of the rollers are substantially concave to match. These concave and convex surfaces contact one another over contact zones. Each roller has an external surface which is asymmetrical relative to the center of the roller and the geometry is such that during use frictional moments develop at the contact zones between the rollers and the rings to generate a positive skew force on the rollers. This renders the bearing self-tracking.

Although bearings are known in which a positive skew force is generated on the rollers under load to set up traction forces to restore the rollers and maintain alignment the present invention is not concerned with alignment but instead with self-tracking.

The inner ring may have an effective raceway of near spherical form and this makes the bearing insensitive to misalignment.

The concave profile for each roller can be a simple arc, an ellipse or made up from several arcs. For example, a central region of the roller external concave surface can be formed with one radius while two outer regions are formed from one larger radius. The rollers may be inclined relative to the bearing axis with the contact zones set at a predetermined static contact angle. The rollers may have sufficient curvature to allow normal reactions during use to generate slightly different dynamic contact angles between the raceway/roller contacts to balance lateral traction forces.

Stress can be allowed to occur over a large proportion of the width of the bearing rings and the bearing can support a wide range of loads both axial and radial.

A bearing in accordance with the invention can have a high dynamic capacity when compared to angular contact or single row radial ball bearings with the same pitch circle diameter.

The invention may be understood more readily, and various other aspects and features of the invention may become apparent, from consideration of the following description.

BRIEF DESCRIPTION OF DRAWINGS

Embodiments of the invention will now be described by way of examples only, with reference to the accompanying drawings wherein.

BEST MODE OF CARRYING OUT THE INVENTION

Figure 1:
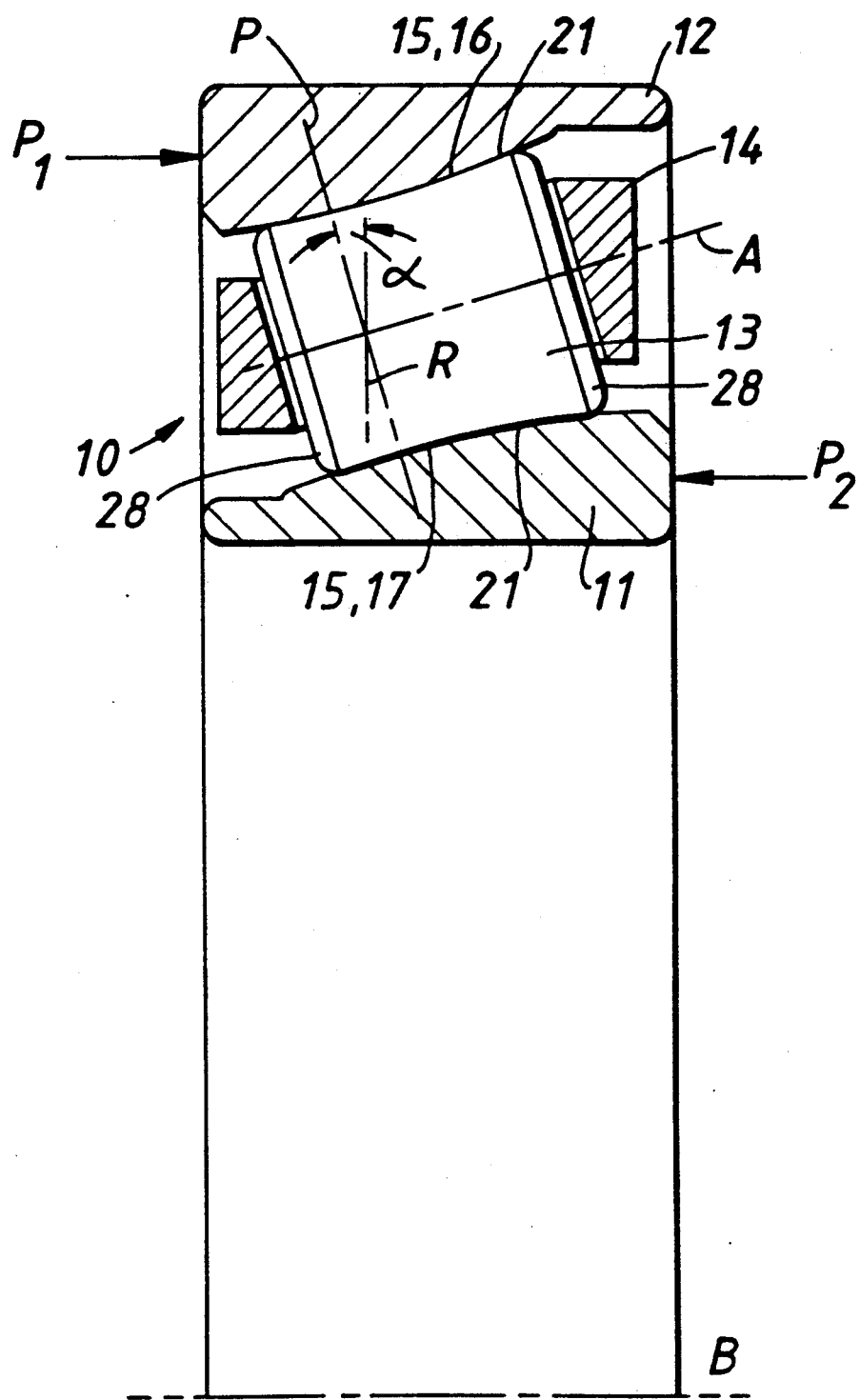
FIG. 1 is a schematic representation of part of a roller bearing constructed in accordance with the invention.
Figure 5:
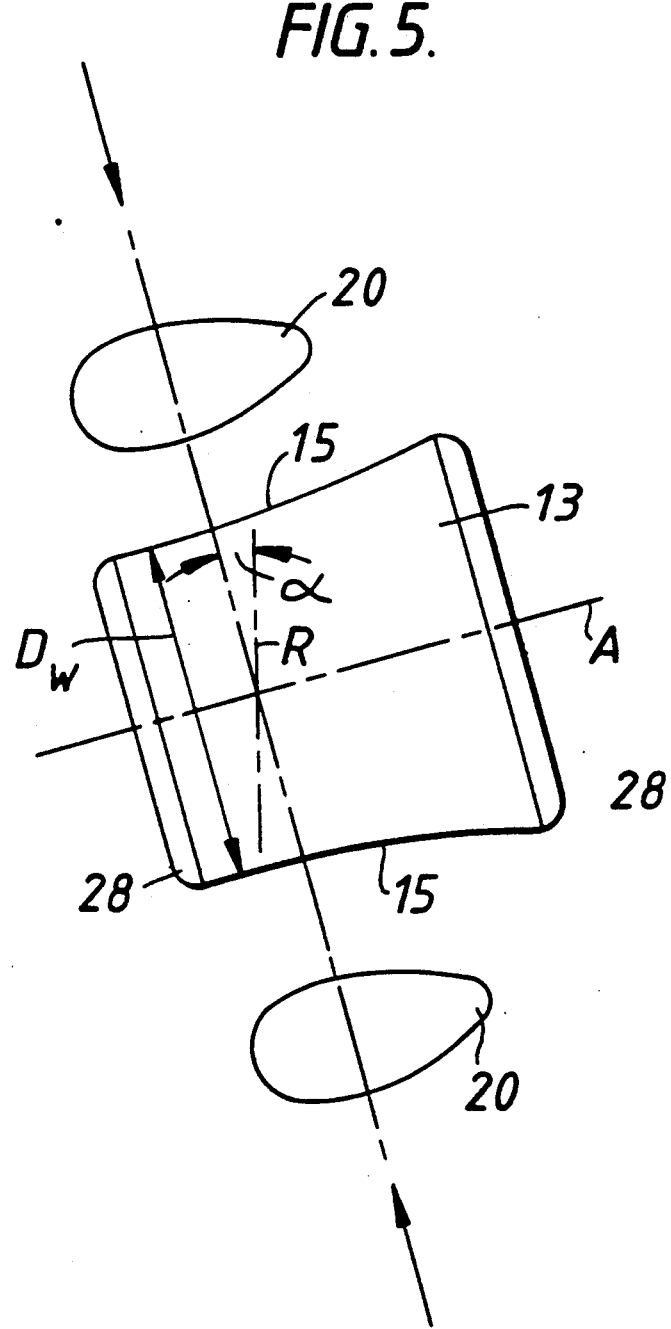
FIG. 5 depicts a roller usable in bearings constructed in accordance with the invention and shows the position of the contact zones when the associated bearing rings are stationary.

FIG. 1 shows, by way of example, a bearing 10 constructed in accordance with the invention. The bearing 10 has inner and outer rings 11,12 and a complement of rollers 13 spaced apart by a cage 14 therebetween. The bearing rollers 13 have concave outer contact surfaces 15 which match convex inner contact surfaces 16,17 of raceways 21 of the rings 11,12. The surfaces 15 are asymmetrical relative to the centers of the rollers 13. The rollers 13 are inclined so that a plane P normal to the longitudinal axis A of one roller 13 and passing through the centers of contact zones (20 FIG. 5) is set at an angle $\alpha$ to a radial plane R normal to the bearing axis B and intersection the plane P on the axis A. The angle $\alpha$ is a design parameter set to one of a number of predetermined standard values to determine the axial and radial load carrying capacity of the bearing.

The surfaces 15,16,17 can be simple arcs or elliptical or of more complex shape made up from a number of arcs which merge to form a continuous smooth surface. the shapes of the surfaces 15,16,17 are designed as a function of the bearing pitch circle diameter the angle $\alpha$ and the length and diameter of the rollers 13 and are designed with regard to the traction forces acting on the contact zones discussed in more detail hereinafter.

Figure 2:
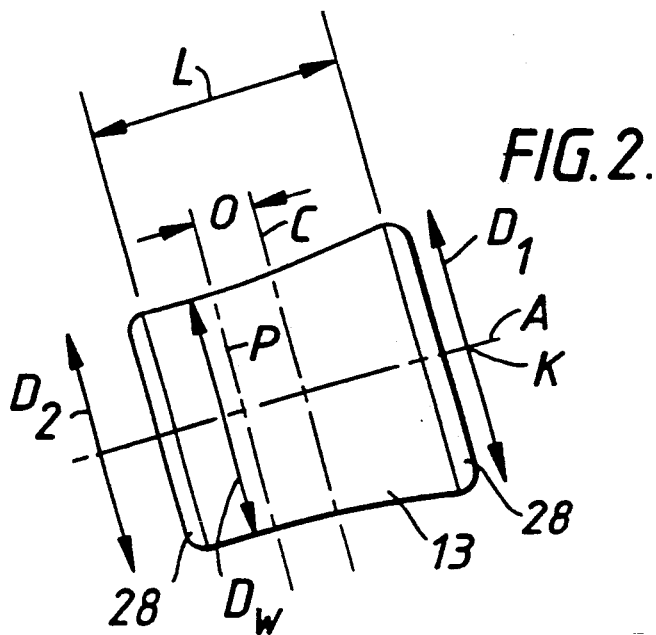
FIG. 2 depicts a roller usable in bearings shown constructed in accordance with the invention.

FIG. 2 depicts one of the rollers 13. As shown the roller 13 has a length L and a waist diameter Dw which lies on the centers of the contact zones (see 20 FIG. 5). The waist diameter Dw is less than the maximum end diameter D1 and preferably not greater than the minimum end diameter D2 to enable the roller 13 to be retained between the rings 11,12 possibly with a certain amount of clearance. The waist diameter Dw is offset by an axial distance 0 from the central plane C of the roller 13. The center K of the large end of the roller 13 will be located on a circle described from the bearing axis which has a diameter larger than the pitch circle diameter of the bearing. The ends of the roller 13 are chamfered as at 28.

The ratio of the length L of the roller 13 to the waist diameter Dw (the length to diameter ratio) is greater than 1 for a bearing designed to have a high dynamic load capacity but may be less than 1 where the bearing width is to be minimised.

Figure 3:
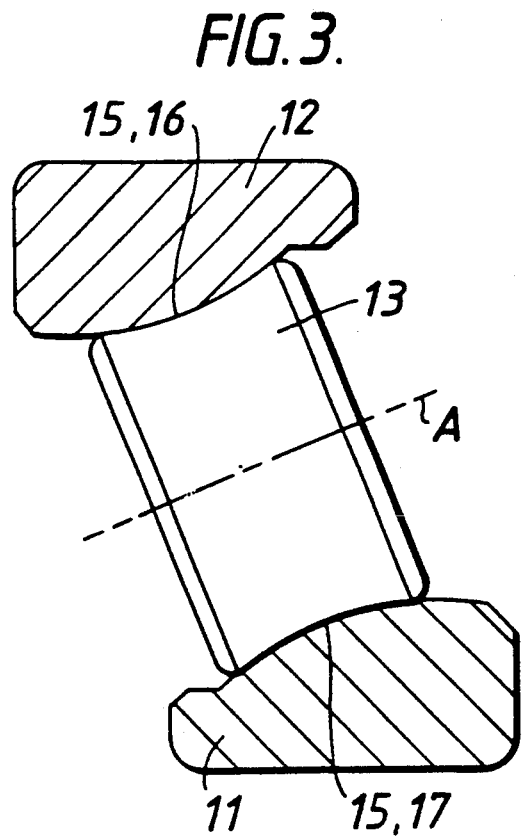
FIG. 3 is a schematic representation of part of another roller bearing constructed in accordance with the invention.

FIG. 3 depicts a bearing with rollers 13 which have length to diameter ratio less than 1.

Figure 4:
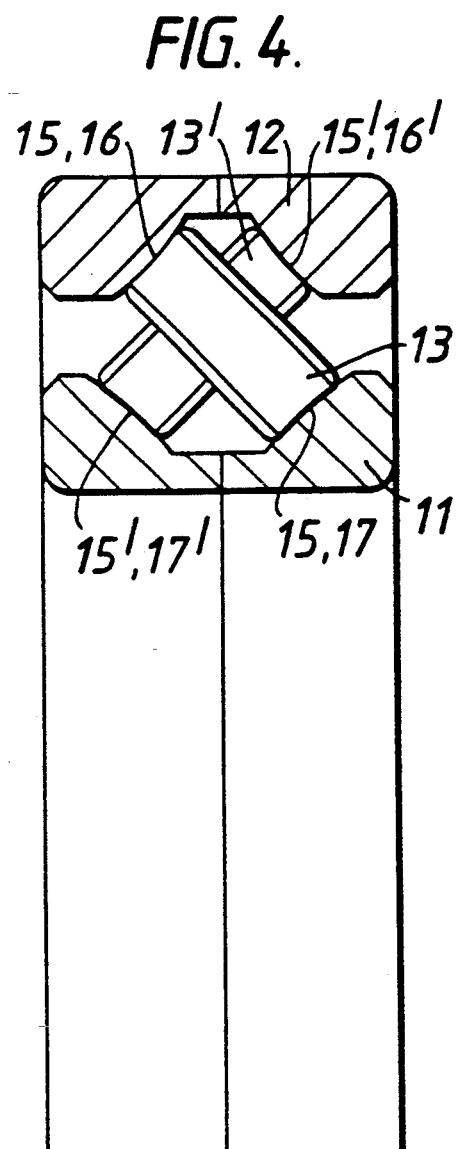
FIG. 4 is a schematic representation of a further roller bearing constructed in accordance with the invention.

FIG. 4 depicts another bearing with sets of rollers 13, 13' disposed in an alternate crossed relationship. In this embodiment the rollers 13,13' also have a length to diameter ratio less than 1 and the rings 11,12 each have two contact surfaces 16,16',17,17' to engage with the surfaces 15,15' of the sets of rollers 13,13'.

Taking the bearing of FIGS. 1 and 2 as an example further theoretical considerations will now be discussed with reference to FIGS. 5 to 8 and in relation to one of the rollers 13. When the bearing is stationary and subjected to thrust forces P1, P2 (FIG. 1) the roller 13 experiences reaction forces which are equal and opposite in magnitude. The forces act through the effective centers of contact zones 20 (FIG. 5) formed by elastic deformation of the rollers 13 and the inner and outer raceway surfaces (not shown). Whilst the roller 13 is static there are no other significant forces present and hence for equilibrium the effective centers of the contact zones must lie in the plane P containing the waist diameter Dw. This plane P is inclined at the static angle $\alpha$.

Figure 6:
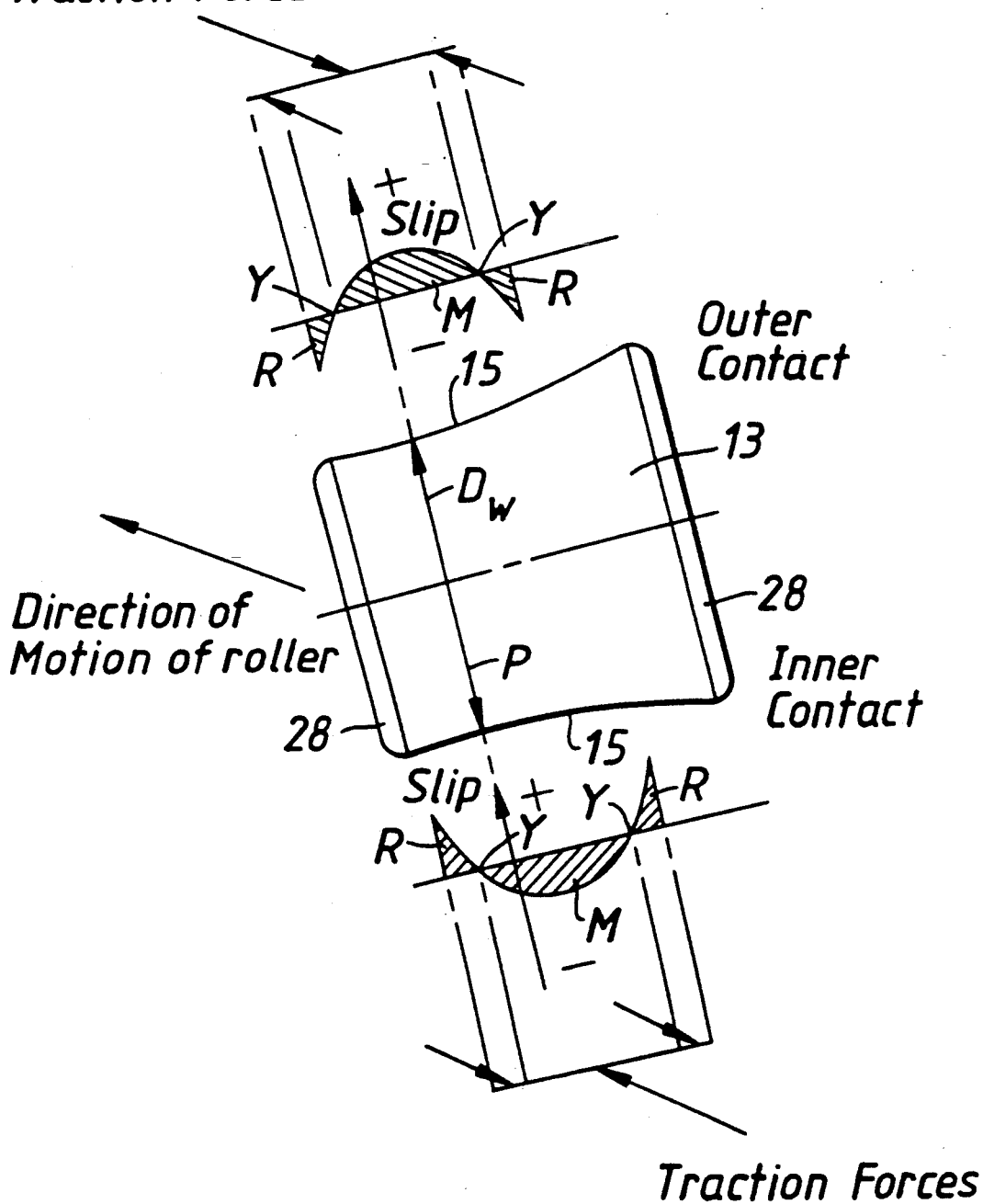
FIG. 6 depicts the roller shown in FIG. 5 and shows further graphically the relationship between the slip and traction forces pertaining to the roller.

Self-tracking occurs when the bearing is set in motion. Assume that the inner ring 11 rotates relative to the outer ring 12. The static equilibrium of the roller 13 is upset and slippage occurs at both inner and outer ring contact zones 20 which gives rise to the traction forces that control the motion of the roller 13. The general form of the curves relating magnitude of slip, in the direction of the rolling at both inner and outer ring contacts, to axial positions along the roller are shown in FIG. 6. Positive slip is defined as slip of the roller 13 with respect to the raceway in the direction of motion of the roller 13 and negative slip is slip of the roller 13 with respect to the raceway in a direction opposite to the motion of the roller 13. As shown in FIG. 6 along the major axes of the inner and outer ring contact zones 20 there are two points Y where the slip is zero. At these two points Y pure rolling occurs which defines the motion of the roller 13. The points Y divide each contact zone into a central region M between outboard regions R. At the outer ring contact zone 20, positive slip occurs over the central region M whilst negative slip occurs at the two outboard regions R of the contact zone 20. Conversely at the inner ring contact zone 20 negative slip occurs over a central region M whilst positive slip occurs at the two outboard regions R. Positions of maximum positive slip at the outer ring contact zone 20 and minimum negative slip at the inner ring contact zone 20 are generally offset with respect to the plane P containing the waist diameter Dw of the roller 13.

The slip fields generate traction forces which are a function of slip velocities, normal stress distributions, surface friction and/or lubricant rheological properties. FIG. 6 also shows the traction forces generated at the inner and outer ring contact zones 20. The regions of positive and negative slip each generate resultant traction forces that act to oppose the direction of slip. Assuming cage-roller forces and lubricant drag to be negligible, then at each contact zone 20 the traction force generated by the central region M is balanced by the traction forces generated at the two outboard regions R. The traction forces at each ring contact zone 20 also gives rise to moments which act about the roller waist diameter Dw. The net moment at the outer ring contact zone 20 acts in a positive direction whereas that at the inner ring contact zone 20 acts in a negative direction. A positive moment is defined as that moment to cause the roller to skew in a direction which steers the roller towards a tracking band of smaller pitch diameter. The net difference between the moment acting at the outer ring contact zone 20 and that acting at the inner ring contact zone 20 determines the magnitude and direction of the roller skew. This parameter -roller skew- defines the operation of the bearing. The bearing should be designed to generate a small positive roller skew when rotating because this positive skew is a crucial factor in providing stability of roller motion and maintaining low rolling friction. Positive skew can be achieved by designing inner and outer ring contact geometry in such a way as to ensure that the skewing moment at the outer ring contact zone is always greater than that at the inner contact zone. In this way the outer raceway controls the tracking motion of the rollers 13.

Normal stress distribution and hence the magnitude and effective positions of the resultant traction forces are a function of the roller skew:

1. As skew increases relative to an equilibrium, the conformity of the outer ring contact increases which produces a consequential increase in the magnitude of the normal stress towards the roller ends relative to the stress acting in the central region. This has the effect of moving the zero slip positions outwards towards the roller ends, reducing the area and magnitude of slip in the outboard regions. This in turn causes a reduction in the traction moment generated by the contact which tends to reduce skew to its equilibrium value.

2. Conversely, as skew decreases relative to the equilibrium, normal stresses are increased towards the center of the outer ring contact and the zero slip positions move towards the roller waist diameter, thus increasing the skewing moment generated by the traction forces at the outboard regions of the contact zones to restore the equilibrium skew.

It is the restoring moment set-up in response to a disturbing force which gives stability to roller motion.

Figure 7:
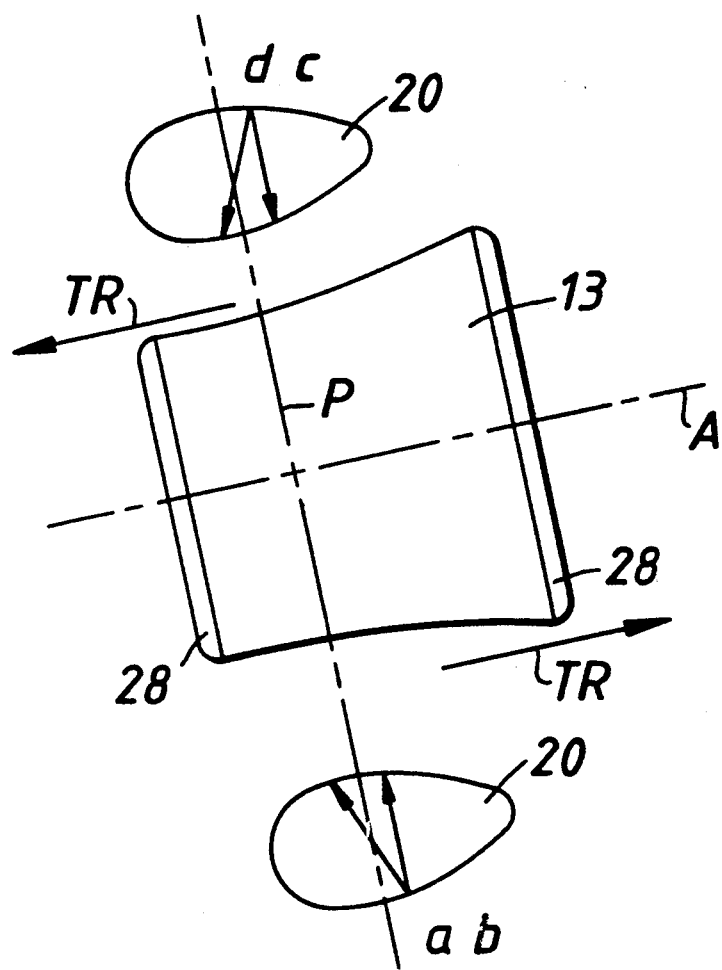
FIG. 7 depicts the roller shown in FIG. 5 and shows further the relative motions which occur when the roller is subjected to lateral traction forces during use.
Figure 8A:
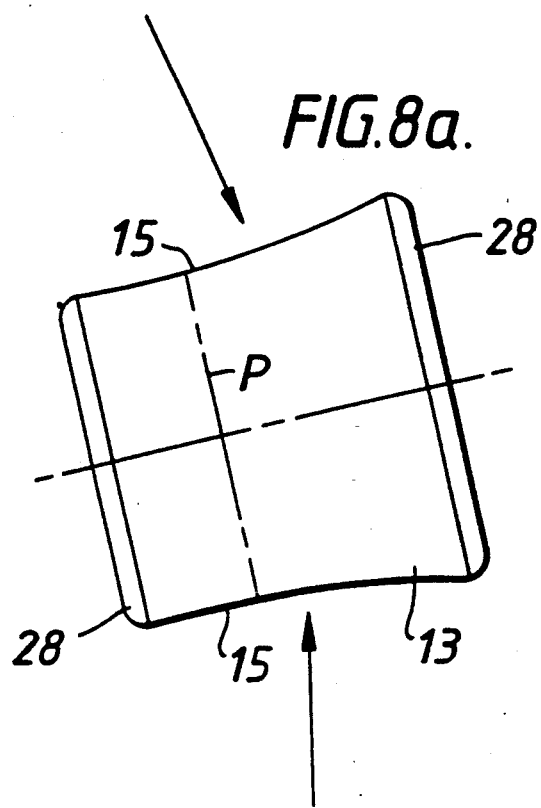
FIG. 8 depicts the roller shown in FIG. 5 and shows further the effect of lateral traction forces on the equilibrium of the roller.
Figure 8B:
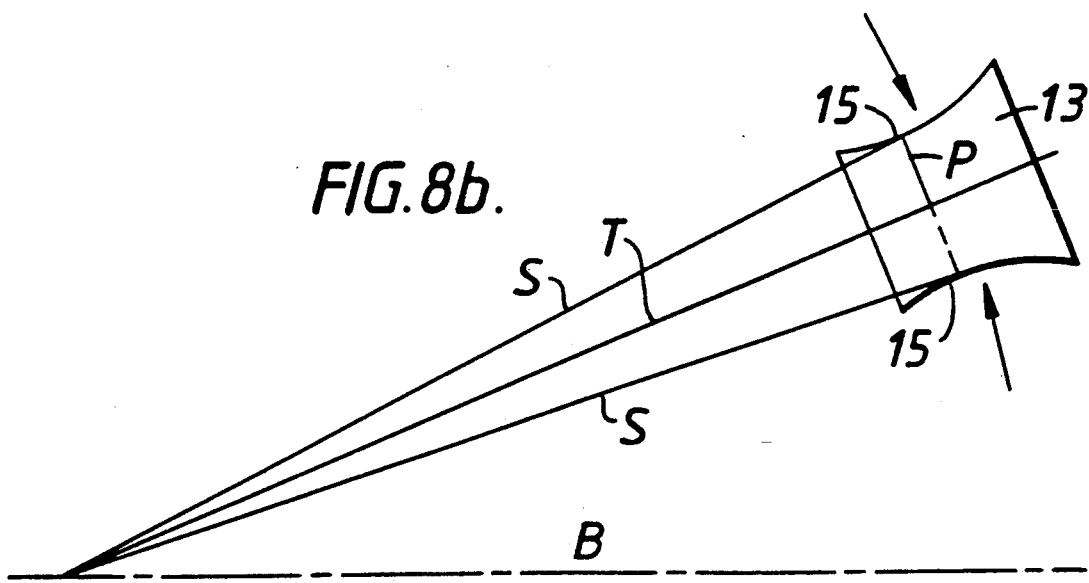

The improvement in rolling friction produced by positive skew comes from a shift in axial position of the roller under the action of lateral traction forces. Skew occurring at a rolling contact generates axial shear strains in the lubricant and opposing contact surfaces as shown in FIG. 7, wherein a and c indicate respective motions of the roller surface through contact, and b and d indicate respective motions of the inner and outer raceway surfaces through contact. The shear strain occurring at the outer ring contact acts so as to drive the roller towards a reduced pitch diameter whereas the axial shear occurring at the inner ring contact acts in the opposite direction. Integrating the shear strains over the complete area of contact yields net lateral traction forces TR at each of outer and inner ring contact zones 20. These forces cause a small displacement and tilt of the roller 13 which in turn creates a shift in the effective centers of inner and outer raceway contact zones 20. The outer ring contact zone 20 is the controlling contact and the roller is displaced towards a reduced pitch diameter. When this happens the normal reactions no longer act through the waist diameter Dw of the roller but become offset as shown in FIG. 8a so as to maintain equilibrium of the axial forces and tilting moments. Reduced friction occurs when the angle between inner and outer ring normal reactions is close to the cone angle defined by an apex at the point of intersection of the bearing axis B and a central plane T through the axis of the roller 13 and surface generating lines S which pass through the effective centers of the inner and outer contact zones as shown in FIG. 8b. In this situation the contact zones 20 lie close to the ideal generated conical surface which defines pure rolling.

A distinction is made between contact geometries occurring when the bearing is stationary and when it is rotating. For the latter it is the change in contact geometry with roller skew that gives rise to self-tracking.

Self-tracking can be designed for a range of roller profiles and hence contact stress distributions. The roller profiles and raceway conformities must however be chosen to generate a positive skewing moment and to do so must take into account the bearing parameters: angle $\alpha$, pitch circle diameter and roller waist diameter. The roller profiles of most practical interest are: an arc of constant radium, an elliptical profile and an arc made up from two or three radii. These profiles can be set up with different inner and outer raceway conformities and roller waist offset 0 to obtain stress distributions which are Hertizian, truncated Hertizian (which occurs when the static load causes the ends of the roller to truncate the Hertizian stress patch), bimodal (which occurs when the roller is designed with a parabolic form causing two Hertizian stress patches to be formed where the roller contacts the inner and outer ring tracks) or rectangular (which occurs when the radius of curvature of the roller is equal to the radius of curvature of the inner and outer ring tracks).

A bearing constructed in accordance with the invention and designed to be self-tracking has a combination of performance characteristics which are different to existing ball, tapered roller and spherical roller bearing designs and which may be used to advantage in applications where combined loading occurs, space is restricted, additional capacity is required and/or misalignments are high.

Insensitivity to misalignment arises from a near spherical inner ring raceway profile. Tilt occurring between inner and outer rings has a low effect on rolling element load distribution and hence contact stress when compared to both ball and tapered roller bearing types.

In an optimised design, the roller profiles have a large radius of curvature, roller-raceway conformities are high and the roller length to diameter ratio is more than one. These factors enable bearings to be produced with a higher dynamic capacity than angular contact or single row radial ball bearings of the same outside diameter and bore. A double row bearing constructed in accordance with the invention has a dynamic load carrying capacity approaching that of the double row spherical roller bearings.

We claim:

1. A roller bearing comprising inner and outer rings (11, 12) and a complement of rollers (13) therebetween each roller having an eternal surface (15) with an axial profile which is substantially concave and the inner and outer rings having raceways (21) with surfaces (16, 17) with axial profiles which are substantially convex and match the shape of the rollers; characterized in that each roller (13) has an external surface (15) which is asymmetrical relative to the center of the roller and the concave and convex surfaces contact one another over contact zones (20) such that during use resultant frictional moments generated in the contact zones between the inner and outer rings and the rollers provide positive skew to the rollers to control the tracking motion of the rollers.

2. A bearing according to claim 1 wherein the external surface (15) of each of the rollers (13) has a concave profile of constant radius.

3. A bearing according to claim 1, wherein the external surface (15) of each of the rollers has a concave profile formed by two arcs of constant radius, a central region of the surface being formed from one radius, and the two outer regions being formed from one larger radius.

4. A bearing according to claim 1, wherein the external surface (15) of each of the rollers has a concave profile made up from several arcs of different radii.

5. A bearing according to claim 1 wherein the external surface (15) of each of the rollers has a concave profile which is elliptical.

6. A bearing according to claim 1, wherein the diameters (D1, D2) of the ends of each roller (15) are different.

7. A bearing according to claim 1, wherein each roller has a waist diameter (Dw) which is offset from the center of the roller.

8. A bearing according to claim 1, wherein the rollers are inclined relative to the bearing axis (B).

9. A bearing according to claim 1 wherein the contact zones provide Hertzian, truncated Hertzian, bimodal or rectangular contact between the rollers and the raceways under load.

10. A bearing according to claim 1 wherein the rollers have sufficient curvature to enable roller-raceway normal reactions to generate different contact angles between the inner and outer ring raceway to roller contacts in order to balance lateral traction forces.

11. A bearing according to claim 1, wherein the rollers are arranged in alternate sets (13, 13') with the axes of alternate rollers crossing one another and the rings have pairs of raceways engaging with each set of rollers.

12. A bearing according to claim 1, wherein a cage (14) is provided to space the rollers apart.

13. A bearing of double row configuration embodying the features of claim 1.

* * * * *